United States Patent
Kachi et al.

(10) Patent No.: US 6,982,499 B1
(45) Date of Patent: Jan. 3, 2006

(54) POWER CONVERTING METHOD AND APPARATUS

(75) Inventors: Tadayoshi Kachi, Kariya (JP); Junichi Takeuchi, Kariya (JP); Seiki Sakata, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 685 days.

(21) Appl. No.: 09/690,183

(22) Filed: Oct. 17, 2000

(30) Foreign Application Priority Data

Nov. 2, 1999 (JP) .......................................... 11-312402

(51) Int. Cl.
*H02J 7/016* (2006.01)

(52) U.S. Cl. .......................... 307/75; 307/46; 320/104; 320/116

(58) Field of Classification Search ................. 307/9.1, 307/10.1, 77, 72, 75, 44, 48, 49, 50, 46; 323/284, 323/285; 180/54.1, 65.1, 65.8; 320/104, 116, 320/118, 119, 162
See application file for complete search history.

(56) References Cited

U.S. PATENT DOCUMENTS

| | | | | |
|---|---|---|---|---|
| 3,343,073 A | * | 9/1967 | Mesenheimer | 307/49 |
| 3,671,843 A | * | 6/1972 | Huntzinger et al. | 320/123 |
| 3,710,226 A | * | 1/1973 | Seike | 320/123 |
| 3,816,805 A | * | 6/1974 | Terry | 320/123 |
| 3,900,784 A | * | 8/1975 | Seike | 320/123 |
| 4,044,293 A | * | 8/1977 | Follmer | 320/123 |
| 4,045,718 A | * | 8/1977 | Gray | 320/123 |
| 4,127,803 A | * | 11/1978 | Etienne | 320/104 |
| 4,156,171 A | * | 5/1979 | Kofink | 320/123 |
| 4,210,856 A | * | 7/1980 | Taylor | 320/123 |
| 4,479,083 A | * | 10/1984 | Sullivan | 320/123 |
| 4,491,779 A | * | 1/1985 | Campbell et al. | 320/123 |
| 4,553,196 A | * | 11/1985 | Tokuyama et al. | 363/21.04 |
| 4,672,294 A | * | 6/1987 | Norton | 320/123 |
| 4,743,830 A | * | 5/1988 | Lakey | 320/104 |
| 5,250,775 A | * | 10/1993 | Maehara et al. | 219/771 |
| 5,528,122 A | * | 6/1996 | Sullivan et al. | 320/118 |
| 5,717,310 A | * | 2/1998 | Sakai et al. | 307/10.1 |
| 5,783,872 A | * | 7/1998 | Blair | 320/104 |

(Continued)

FOREIGN PATENT DOCUMENTS

| | | |
|---|---|---|
| JP | 3-56040 | 3/1991 |
| JP | 3-155365 | 7/1991 |
| JP | 4-251532 | 9/1992 |
| JP | 7-1157300 | 5/1995 |
| JP | 9-292925 | 11/1997 |
| JP | 10-164709 | 6/1998 |
| JP | 11-187649 | 7/1999 |

OTHER PUBLICATIONS

B.W.Williams; Power Electronics Devices, Drivers, Applications, and Passive Components; 1992; The Macmillan Press LTD, second edition, pp. 384–386.*

*Primary Examiner*—Brian Sircus
*Assistant Examiner*—Roberto J. Rios
(74) *Attorney, Agent, or Firm*—Woodcock Washburn LLP

(57) ABSTRACT

A power converter that can be used in a vehicle equipped with an electrical motor provides power to both the electrical motor and other, auxiliary loads, such as a headlamp, that require a different voltage. The power converter includes a first DC power supply that generates a first voltage equivalent to the voltage required by the auxiliary loads and a second DC power supply, connected in series with the first DC power supply, that generates a differential voltage, where the sum of the differential voltage and the first voltage is the voltage required to drive the electrical motor. A DC-DC converter is connected to the second power supply and converts the differential voltage to the voltage required to drive the auxiliary loads.

13 Claims, 5 Drawing Sheets

U.S. PATENT DOCUMENTS

| | | | | |
|---|---|---|---|---|
| 5,900,716 A | * | 5/1999 | Collar et al. | 320/118 |
| 5,905,360 A | * | 5/1999 | Ukita | 320/118 |
| 5,952,813 A | * | 9/1999 | Ochiai | 320/104 |
| 5,969,506 A | * | 10/1999 | Neal | 320/125 |
| 5,977,657 A | * | 11/1999 | Van Lerberghe | 307/44 |
| 6,058,035 A | * | 5/2000 | Madenokouji et al. | 363/95 |
| 6,181,101 B1 | * | 1/2001 | Arai et al. | 320/104 |
| 6,218,643 B1 | * | 4/2001 | Iwata et al. | 219/202 |
| 6,271,645 B1 | * | 8/2001 | Schneider et al. | 320/118 |
| 6,275,004 B1 | * | 8/2001 | Tamai et al. | 320/118 |
| 6,323,608 B1 | * | 11/2001 | Ozawa | 318/139 |
| 6,373,226 B1 | * | 4/2002 | Itou et al. | 320/132 |
| 6,377,029 B1 | * | 4/2002 | Krieger et al. | 320/104 |
| 6,424,608 B1 | * | 7/2002 | Takeuchi | 369/47.53 |
| 6,515,455 B2 | * | 2/2003 | Hidaka | 320/135 |
| 2002/0167291 A1 | * | 11/2002 | Imai et al. | 320/119 |

* cited by examiner

POWER CONVERTING METHOD AND APPARATUS

BACKGROUND OF THE INVENTION

The present invention relates to a method and apparatus for converting DC power to DC power of a different voltage from that of the original one.

FIG. 7 shows a first prior art voltage-drop type DC-DC converter 70. The DC-DC converter 70 converts an input voltage $V_I$ of a DC power supply 71 to an output voltage $V_O$ that is lower than the input voltage $V_I$. When a transistor TR is ON, a voltage $V_I-V_O$ is applied to a coil CL. The amount of change in current, $\Delta IL$, when the transistor TR is turned on is expressed by $\Delta IL=\{(V_I-V_O)/L\}T_{on}$ where L is the inductance of the coil CL and $T_{on}$ is the ON duration of the transistor TR. When the transistor TR is turned off, a commutation diode D keeps the current flowing across the coil CL. When the transistor TR is turned off, the amount of current change $\Delta IL$ is expressed by $\Delta IL=(V_O/L)T_{off}$ where $T_{off}$ is the OFF duration of the transistor TR. When the current continuously flows across the coil CL, both current changes are equal to each other in a steady state. Therefore, the output voltage $V_O$ is $\{T_{on}/(T_{on}+T_{off})\}V_I$, which is smaller than the input voltage $V_I$.

Other known types of DC-DC converters than the voltage-drop type DC-DC converter 70 include a booster type DC-DC converter and a booster/voltage-drop type DC-DC converter.

Recently, hybrid motor vehicles have been put to use in order to improve fuel efficiency and reduce the exhaust gas of motor vehicles. Hybrid vehicles use a running motor when they are started or when they run at a low speed, and use an engine when they run at a middle speed. The operational voltage for various kinds of units, such as a headlight, which a hybrid motor vehicle is equipped, is lower than the operational voltage for the running motor. The conventional hybrid motor vehicles therefore need two power supplies, a high-voltage power supply for the running motor and a low-voltage power supply for the various kinds of units.

FIG. 8 shows a prior art high-voltage and low-voltage generating apparatus 80. The apparatus 80 has an engine 51, an alternator 52, a high-voltage battery 53, a low-voltage battery 56 and a DC-DC converter 54. The alternator 52 has a three-phase AC generator 52a and a three-phase full-wave rectifier 52b which are driven by the engine 51. A high-voltage unit (motor) 55 is connected to the high-voltage battery 53. The alternator 52 generates high-voltage DC power to charge the high-voltage battery 53. The DC-DC converter 54 lowers the voltage of the high-voltage battery 53 to charge the low-voltage battery 56 and supplies the lowered voltage to a low-voltage unit 57.

FIG. 9 shows another prior art high-voltage and low-voltage supplying apparatus 90. The apparatus 90 has two alternators 52 connected to the engine 51. The two alternators 52 respectively charge the high-voltage battery 53 and the low-voltage battery 56.

The apparatus 80 in FIG. 8 needs the large-capacity DC-DC converter 54 and two batteries 53 and 56 and thus inevitably is large and heavy. The apparatus 90 in FIG. 9 is heavy and bulky because of the two alternators 52. The apparatuses 80 and 90 in FIGS. 8 and 9 are therefore unfit for hybrid motor vehicles.

SUMMARY OF THE INVENTION

It is an object of the present invention to provide a compact power converting apparatus, which stably generates at least two DC voltages, a power generating method, and a vehicle having the power converting apparatus.

To achieve the above object, the first aspect of the present invention provides a method of supplying power using a main DC power supply for generating a predetermined voltage to supply a first output voltage substantially equal to the predetermined voltage and a second output voltage lower than the predetermined voltage. The method includes connecting a first DC power supply for generating the same voltage as the second output voltage in series to a second DC power supply for generating a differential voltage between the first output voltage and the voltage from the first DC power supply, thereby forming the main DC power supply, connecting a DC-DC converter to the second DC power supply, and stepping down the voltage output from the second DC power supply to produce the second output voltage by using the DC-DC converter.

The second aspect of the present invention provides a power converting apparatus for generating a first output voltage and a second output voltage lower than the first output voltage. The apparatus includes a first DC power supply for generating the same voltage as the second output voltage, a second DC power supply, which is connected in series to the first DC power supply for generating a voltage corresponding to a difference between the first output voltage and the voltage from the first DC power supply, and a DC-DC converter, which is connected to the second DC power supply for converting the voltage from the second DC power supply to the second output voltage.

The third aspect of the present invention provides a method of generating a boosted voltage higher than a voltage of a main DC power supply. The method includes producing a differential voltage between a target boosted voltage and the voltage of the main DC power supply using a DC-DC converter, and producing the boosted voltage by adding the differential voltage to the voltage of the main DC power supply.

The fourth aspect of the present invention provides a power converting apparatus for generating a predetermined boosted voltage. The power converting apparatus includes a DC power supply, and a DC-DC converter, which is connected to the DC power supply, for producing a differential voltage between the predetermined boosted voltage and a voltage of the DC power supply. The predetermined boosted voltage is provided as a sum of the voltage of the DC power supply and the differential voltage.

The fifth aspect of the present invention provides a power converting method of supplying a first output voltage substantially equal to a voltage of a main battery and a second output voltage lower than the voltage of the main battery. The method includes forming the main battery by connecting a first battery for generating the same voltage as the second output voltage in series to a second battery for generating a voltage corresponding to a difference between the first output voltage and the voltage of the first battery, producing the first output voltage by adding the voltages of the first and second batteries, connecting a charge power supply for generating a voltage lower than the voltage of the main battery to an output of a DC-DC converter, producing a differential voltage between the voltage of the main battery and the voltage of the charge power supply using the DC-DC converter, and charging the main battery with a sum of the differential voltage and the voltage of the charge power supply.

The sixth aspect of the present invention provides a power converting apparatus for generating a first DC voltage and a second DC voltage lower than the first DC voltage. The apparatus includes a first battery for generating the same voltage as the second DC voltage, a second battery, which is connected in series to the first battery for generating a differential voltage between the first DC voltage and the voltage of the first battery, and a polarity-inverting type DC-DC converter having an input connected to the second battery and an output connected to the first battery. The DC-DC converter includes a first switching element and a first diode connected in parallel to each other, a second switching element connected between the output of the DC-DC converter and the first battery, and a second diode connected in parallel to the second switching element.

The seventh aspect of the present invention provides a vehicle having a running motor operable with a predetermined first operational voltage, and a subload operable with a second operational voltage lower than the first operational voltage. The running motor is connected to a main battery assembly for generating the first operational voltage. The battery assembly includes a first battery cell for generating the second operational voltage and a second battery cell, connected in series to the first battery cell, for generating a differential voltage between the first operational voltage and the second operational voltage. The vehicle includes a power converting apparatus, which is connected between the second battery cell and the subload, for converting the voltage of the second battery cell to the second operational voltage and supplying the second operational voltage to the subload.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

A power converting apparatus 100 according to a first embodiment of the present invention will now be described referring to FIGS. 1 to 3.

Figure 1:
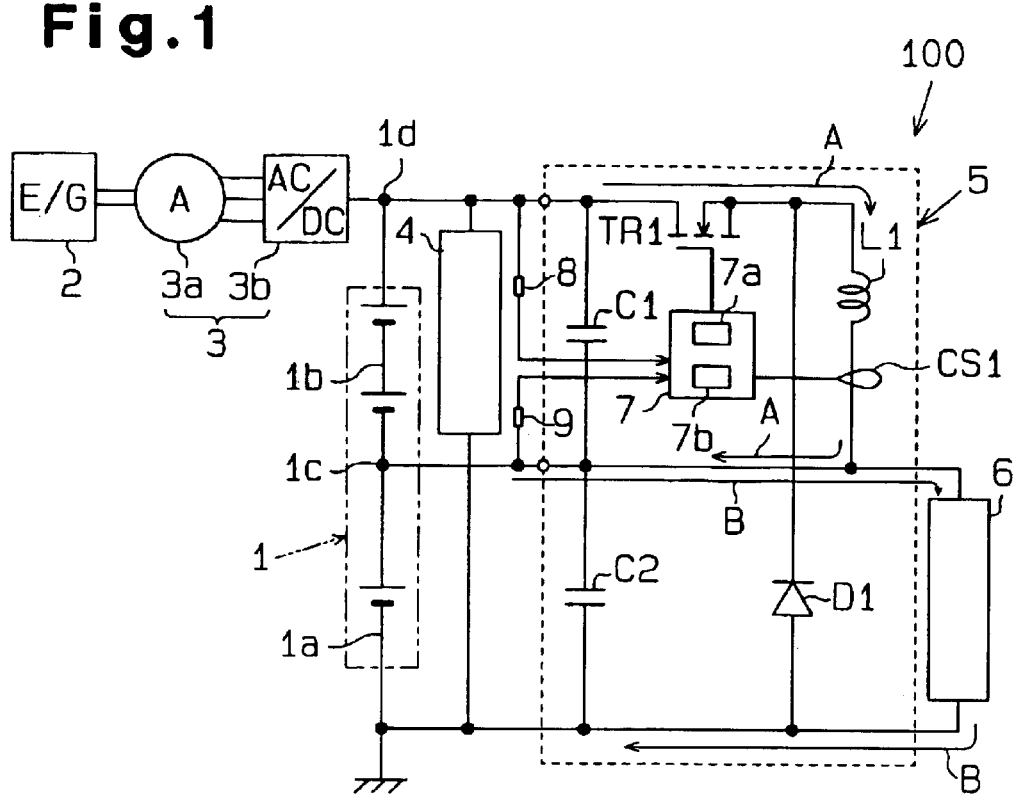
FIG. 1 is a schematic block diagram of a power converting apparatus according to a first embodiment of the present invention.
Figure 2:
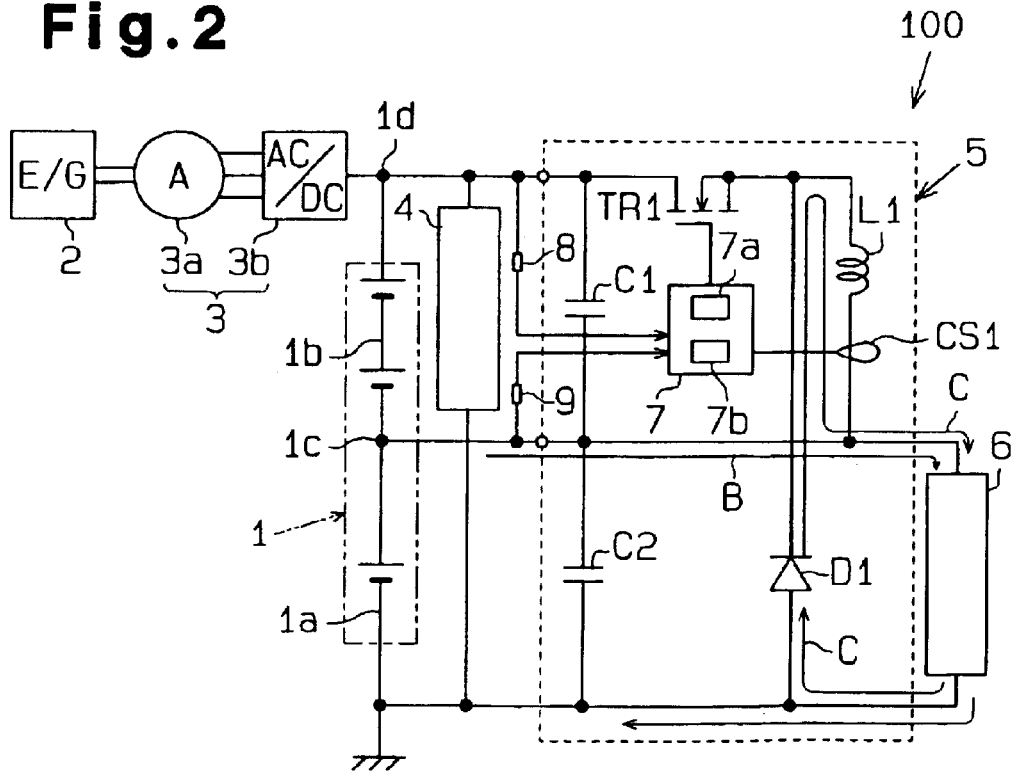
FIG. 2 is a schematic block diagram of the power converting apparatus in FIG. 1, showing the flows of currents when a transistor is off.

As shown in FIG. 1, the power converting apparatus 100 includes a battery assembly 1 and a DC-DC converter 5.

The battery assembly 1, which is a DC power supply for a vehicular driving motor, has a first battery cell 1a and a second battery cell 1b connected in series. The first battery cell 1a generates a voltage that is the same as a desired low-voltage DC output. The second battery cell 1b generates a differential voltage between the high-voltage DC output and the output voltage of the first battery cell 1a. The voltage of the desired low-voltage DC output is substantially equal to the operational voltage (12V) for low-voltage units (e.g., a headlight 6) of a vehicle. The voltage of the high-voltage DC output is substantially equal to the operational voltage (36V) for high-voltage units (e.g., a running motor 4). The battery assembly 1 has a 36-V output terminal 1d and a 12-V intermediate terminal or tap 1c. The charge voltage of the battery assembly 1 is 36V and the charge voltage at the intermediate tap 1c is 12V.

An alternator 3 includes a generator 3a and a full-wave rectifier 3b that are driven by an engine 2. While the engine 2 is running, the alternator 3 charges the battery assembly 1 with a voltage of 36V. The running motor 4 is connected to the battery assembly 1.

The DC-DC converter 5, which is a polarity-inverting type or buck boost type, is connected to the battery assembly 1. The headlight 6 is connected to the battery assembly 1 via the DC-DC converter 5. The running motor 4 is connected between the battery assembly 1 and the DC-DC converter 5.

The DC-DC converter 5 has a switching element or transistor TR1, an inductor L1, a fly-wheel diode D1, a current sensor CS1, a control circuit 7 and capacitors C1 and C2. The transistor TR1 is preferably MOSFET (Metal Oxide Semiconductor Field Effect Transistor). The transistor TR1 is connected in series to the inductor L1. That is, the transistor TR1 has a drain connected to a positive terminal 1d (36-V terminal) of the battery assembly 1 and a source connected to the inductor L1. The fly-wheel diode D1 is located between a ground terminal or 0-V terminal and a node between the transistor TR1 and the inductor L1. The capacitor C1 is located between the 36-V terminal 1d and the 12-V terminal 1c of the battery assembly 1. The capacitor C2 is located between the 12-V terminal 1c of the battery assembly 1 and the 0-V terminal.

The transistor TR1 and the current sensor CS1 are connected to the control circuit 7. Also connected to the control circuit 7 are a first voltage sensor 8 for detecting an output voltage of the running motor 4 and a second voltage sensor 9 for detecting an output voltage $V_O$ of the headlight 6. The control circuit 7 controls the ON/OFF switching of the transistor TR1 with a high frequency in such a way that the ratio of the detected voltage of the first voltage sensor 8 to the detected voltage of the second voltage sensor 9 becomes 3:1. This makes it possible to keep the ratio of the output voltage to the running motor 4 to the output voltage to the headlight 6 at 3:1.

The control circuit 7 incorporates a comparator 7a and a triangular wave oscillator 7b. The comparator 7a compares the difference between the detected voltages of the first and second voltage sensors 8 and 9 and the output of the triangular wave oscillator 7b and generates a transistor drive pulse signal (see FIG. 3) according to the comparison result. The control circuit 7 supplies the transistor drive pulse signal to the transistor TR1. The transistor drive pulse signal controls an ON time $T_{on}$ and OFF time $T_{off}$ of the transistor TR1. When the ratio of the ON time $T_{on}$ of the transistor TR1 to the OFF time $T_{off}$ is 1:2, for example, the ratio of the detected voltage of the first voltage sensor 8 to the detected voltage of the second voltage sensor 9 is 3:1. When the ratio of the detected voltages of the first and second voltage sensors 8 and 9 is shifted from 3:1, the control circuit 7 changes the ON time $T_{on}$ and the OFF time $T_{off}$ to correct for the deviation.

The operation of the power converting apparatus 100 will now be discussed.

The DC-DC converter 5 has input terminals that are the 36-V terminal 1d and the 12-V terminal 1c of the battery assembly 1, and 12V of the battery assembly 1 is a ground voltage in the DC-DC converter 5. Therefore, the input voltage $V_I$ of the DC-DC converter 5 is 24V. The output voltage $V_O$ of the DC-DC converter 5 is −12V because the 12-V intermediate tap 1c is taken as a reference.

When the transistor TR1 is turned on, the current flows as indicated by an arrow A in FIG. 1. This causes the inductor L1 to store the power that is supplied from the second battery cell 1b. Irrespective of the switching of the transistor TR1, the capacitor C2 is charged with the current from the first battery cell 1a and the current is supplied to the headlight 6 from the capacitor C2.

When the transistor TR1 is turned off while the current is flowing in the inductor L1, the diode D1 keeps the current flowing through the inductor L1, the fly-wheel diode D1 is set on to keep this current. Then, the power stored in the inductor L1 is supplied to the headlight 6 (an arrow C in FIG. 2) as a low-voltage DC output.

Therefore, the power that drives the headlight 6 is supplied from both the DC-DC converter 5 and the first battery cell 1a. When the current supplied to the headlight 6 is 100 A, for example, a current of 67 A from the DC-DC converter 5 and a current of 33 A from the battery cell 1a are both supplied to the headlight 6.

When the power converting apparatus 100 is in a steady state, the output voltage $V_O$ and an output current $I_O$ are expressed by the following equations.

$$V_O = (T_{on}/T_{off})V_I$$

$$I_O = (V_I T_{on})^2 / \{2L(T_{on}+T_{off})V_O\}$$

The control circuit 7 controls the ON time $T_{on}$, and OFF time $T_{off}$ in such a way as to set $V_O = -V_I/2$, so that ⅔ of the total power supplied to the headlight 6 is supplied from the DC-DC converter 5 and the remaining ⅓ is supplied from the battery assembly 1. Specifically, the control circuit 7 monitors the output current $I_O$ detected by the current sensor CS1 and controls the ON time $T_{on}$ and the OFF time $T_{off}$ in such a manner that the ratio of the voltage supplied to the running motor 4 to the supply voltage $V_O$ to the headlight 6 becomes 3:1.

When a current of 33 A or larger is supplied from the battery cell 1a (overloaded state), for example, the ratio of the detected voltages of the voltage sensors 8 and 9 is shifted from 3:1. In this case, after the overloaded state is released, the control circuit 7 controls the ON time $T_{on}$ and the OFF time $T_{off}$ in such a manner that the ratio of the detected voltages of the voltage sensors 8 and 9 becomes 3:1.

If there is no variation in the load of the headlight 6, the ratio of the ON time $T_{on}$ to the OFF time $T_{off}$ does not change. Because the load of the headlight 6 frequently varies, however, the control circuit 7 controls the ON time $T_{on}$ and the OFF time $T_{off}$ based on detection signals from the first and second voltage sensors 8 and 9 in such a way that the ratio of the detected voltages of the voltage sensors 8 and 9 becomes 3:1.

Figure 3:
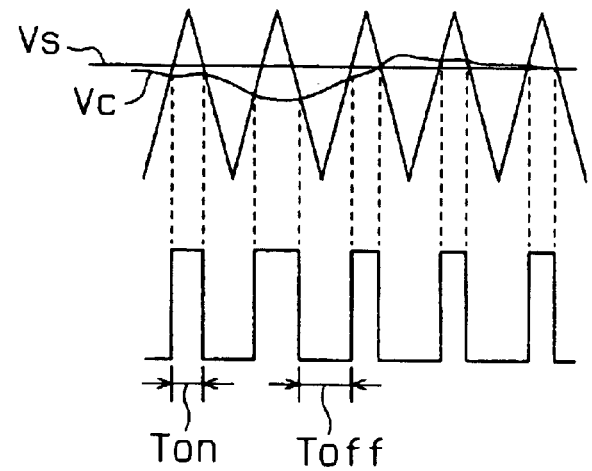
FIG. 3 is an waveform diagram showing a pulse signal for driving the transistor.

As shown in FIG. 3, the voltage of the triangular wave signal of the triangular wave oscillator 7b periodically changes. The comparator 7c generates a pulse signal whose level goes to high when a comparison voltage Vc based on the difference between the detection signals of the first and second voltage sensors 8 and 9 is smaller than the voltage of the triangular wave signal and goes to low when the comparison voltage Vc is greater than the voltage of the triangular wave signal, and sends the pulse signal to the transistor TR1. The transistor TR1 is turned on when the pulse signal has a high level, and is turned off when the pulse signal has a low level. When the comparison voltage Vc is equal to a predetermined value Vs, the ratio of the detected voltages of both voltage sensors 8 and 9 is 3:1. At this time, the control circuit 7 outputs a pulse signal whose ratio of the ON time $T_{on}$ to the OFF time $T_{off}$ is 1:2. When the ratio of the detected voltages of both voltage sensors 8 and 9 is larger than 3:1, the detected voltage of the first voltage sensor 8 is relatively large and the comparison voltage Vc is larger than the value Vs. At this time, the ON time $T_{on}$ is controlled to be shorter. When the ratio of the detected voltages of both voltage sensors 8 and 9 is smaller than 3:1, the comparison voltage Vc is smaller than the value Vs. At this time, the ON time $T_{on}$ is controlled to be longer. By adjusting the ON time $T_{on}$ of the switching element using the triangular wave signal, the control circuit 7 controls the switching of the transistor TR1 in such a way that the ratio of one output voltage to the other coincides with a target value.

The capacitors C1 and C2 smooth the current from the battery assembly 1. When the capacitance of the transistor TR1 is relatively large, the capacitor C1 can be eliminated.

The power converting apparatus 100 of the first embodiment has the following advantages.

The DC-DC converter 5 does not directly step down the high voltage of 36V of the battery assembly 1 to the predetermined voltage of 12V, but steps down the output voltage of 24V of the second battery cell 1b to the predetermined voltage of 12V. Since the DC-DC converter 5 needs a small capacity, the DC-DC converter 5 can be made compact, which makes the power converting apparatus 100 compact.

The battery assembly 1 has the first battery cell 1a that outputs a voltage of 12V equal to the voltage of the low-voltage DC output, the second battery cell 1b that outputs a voltage of 24V or the difference between the voltage of the high-voltage DC output and the output voltage of the first battery cell 1a, and the intermediate tap 1c. It is therefore possible to easily secure the layout space for the first and second battery cells 1a and 1b.

As the input terminal of the DC-DC converter 5 is connected to the second battery cell 1b and the output terminal to the first battery cell 1a, the power converting apparatus 100 has a simple structure.

Being compact and simple in structure, the power converting apparatus 100 is suitable for use in a vehicle.

Because a part of the output of the DC-DC converter 5 is used to charge the first battery cell 1a when the discharge capacity of the first battery cell 1a drops down to or below a predetermined value, discharging the first battery cell 1a alone is suppressed.

Second Embodiment

A power converting apparatus 110 according to a second embodiment of this invention will now be described referring to FIGS. 4 and 5. The power converting apparatus 110 steps down or boosts the supply voltage. The power converting apparatus 110 has a second transistor (MOSFET) TR2 in place of the fly-wheel diode D1 used in the first embodiment.

Figure 4:
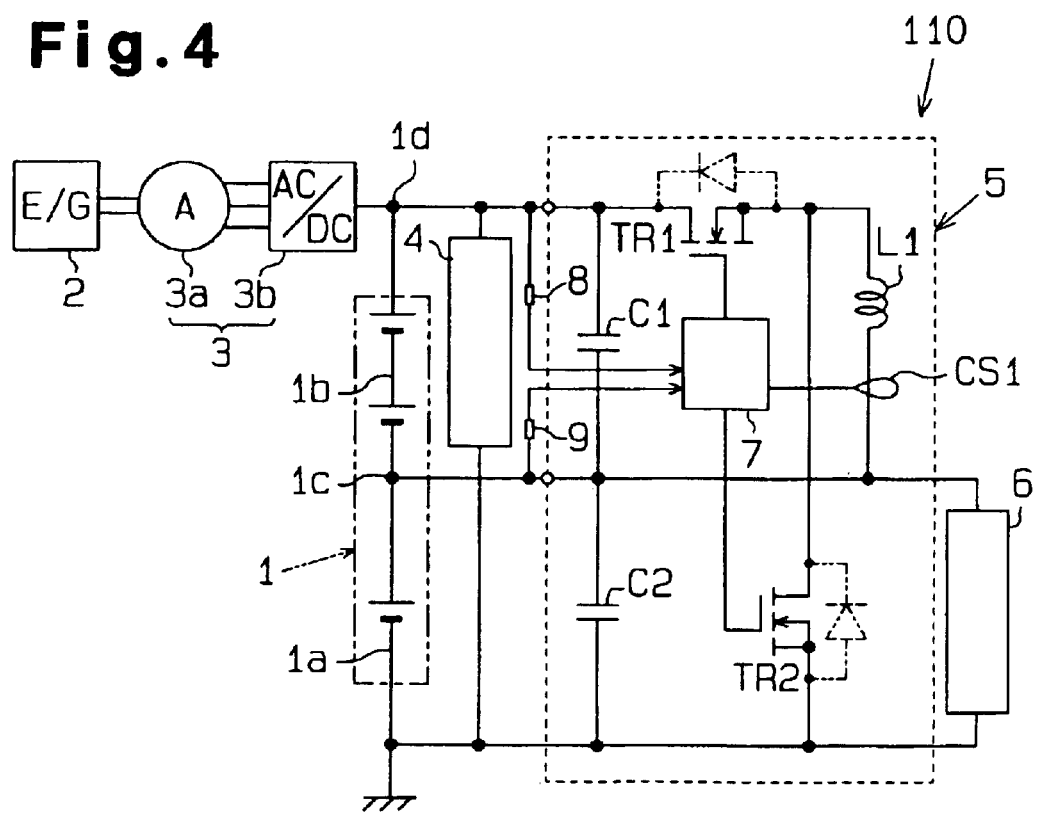
FIG. 4 is a schematic block diagram of a power converting apparatus according to a second embodiment of the present invention.
Figure 5:
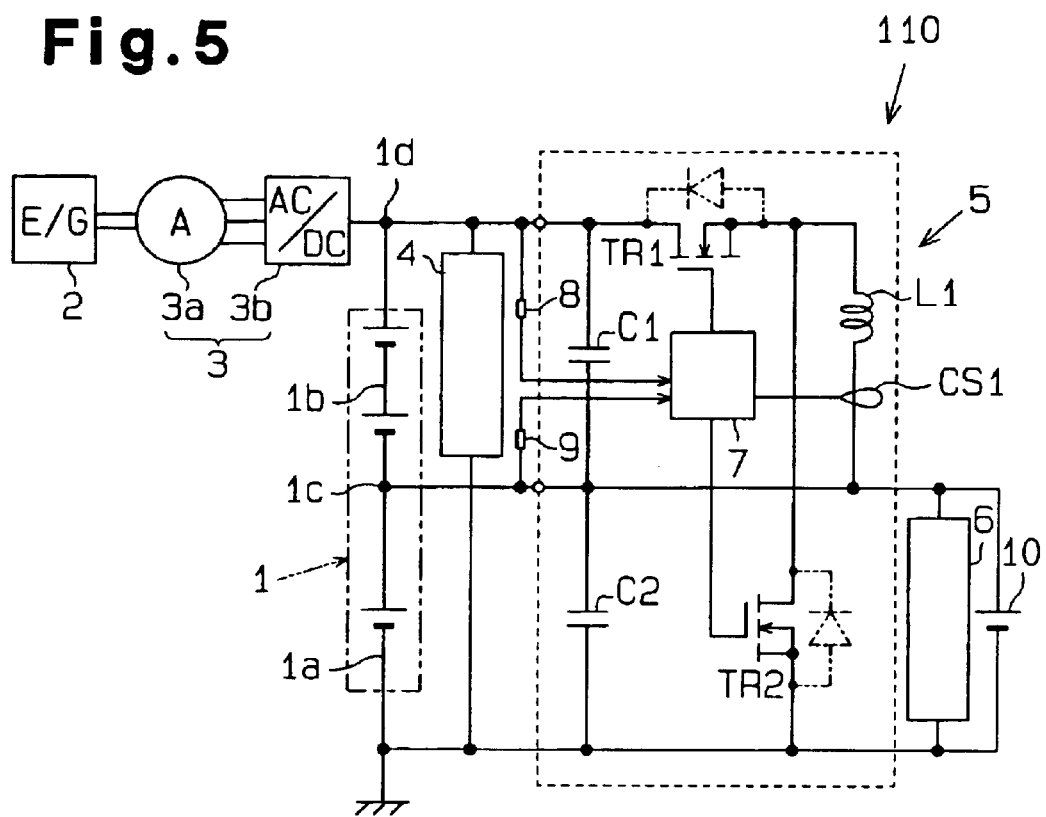
FIG. 5 is a schematic block diagram of the power converting apparatus in FIG. 4, which is being charged.

Each of the first and second transistors TR1 and TR2 has a parasitic diode between its source and drain as indicated by dotted lines in FIG. 4. Therefore, the use of MOSFETs for the first transistor TR1 (switching element) and the second transistor TR2 is equivalent to the use of a parallel circuit of a switching element and a diode. When the second transistor TR2 is kept off, the DC-DC converter 5 functions the same as the first embodiment.

In the power converting apparatus 110, therefore, the second transistor TR2 is normally kept off and the first transistor TR1 is switched on or off. When the output voltage of the battery assembly 1 falls below a predetermined voltage, an additional DC power supply 10 is connected to the output terminal of the DC-DC converter 5 as shown in FIG. 5 to charge the battery assembly 1. The additional DC power supply 10 can have the same output voltage as the output voltage of the first battery cell 1a.

At the time of charging the battery assembly 1, the first transistor TR1 is kept off and the second transistor TR2 is switched on and off. In this case, the DC-DC converter 5 serves as a booster type DC-DC converter.

The output voltage of the DC power supply 10 or the input voltage to the DC-DC converter 5 in a boost mode is expressed by $V_I2$ and the output voltage of the DC-DC converter 5 is expressed by $V_O2$. The voltage that is applied to the inductor L1 when the second transistor TR2 is on is $V_I2$ while the voltage that is applied to the inductor L1 when the second transistor TR2 is off is $(V_O2-V_I2)$. When the current continuously flows across the inductor L1, therefore, the amount of a change in the current flowing across the inductor L1 during the ON time $T_{on}$ is substantially equal to the amount of a change in the current flowing across the inductor L1 during the OFF time $T_{off}$. This is shown in the following equation.

$$(V_I2/L)T_{on}=\{(V_O2-V_I2)/L\}T_{off}$$

Thus, $$V_O2=\{(T_{on}+T_{off})/T_{off}\}V_I2.$$

The control circuit 7 controls the ON/OFF switching of the second transistor TR2 in such a way that the ratio of $V_O2$ to $V_I2$ becomes 2:1. In other words, the control circuit 7 controls the second transistor TR2 in such a way that the ratio of the difference (24V) between the charge voltage of 36V of the battery assembly 1 and the output voltage of 12V of the DC power supply 10 to the output voltage of 12V of the DC power supply 10 is maintained at 2:1. As a result, the battery assembly 1 is charged with a voltage of 36V, which is the output voltage of 12V of the DC power supply 10 plus the boosted output voltage of 24V of the DC-DC converter 5.

The second embodiment therefore has the advantages of the first embodiment and the following additional advantages.

The DC-DC converter 5 outputs a voltage that is the output voltage (12V) of the DC power supply 10 subtracted from the charge voltage (36V) of the battery assembly 1, and this output voltage (24V) is added to the output voltage (12V) of the DC power supply 10. The battery assembly 1 can be charged with the resultant voltage (36V). This means that the battery assembly 1 can be charged using the battery installed in another vehicle which has only the conventional battery for low-voltage units.

The power converting apparatus 110 can be constructed by providing the polarity-inverting type DC-DC converter 5 with the transistor TR1, which has a switching element and a diode connected in parallel, and the transistor TR2, which also has a switching element and a diode connected in parallel and which is used in place of the fly-wheel diode D1.

The transistors (MOSFETs) TR1 and TR2 serve as diodes when they are turned off in a step-down mode or a boost mode. Therefore, the structure of the power converting apparatus 110 is simpler than that of the power converting apparatus that has a parallel circuit of a switch element and a diode.

Third Embodiment

A power converting apparatus 120 according to a third embodiment of this invention will now be described referring to FIG. 6. The power converting apparatus 120 has an insulated DC-DC converter (fly-back converter) 13 that has a transformer capability.

Figure 6:
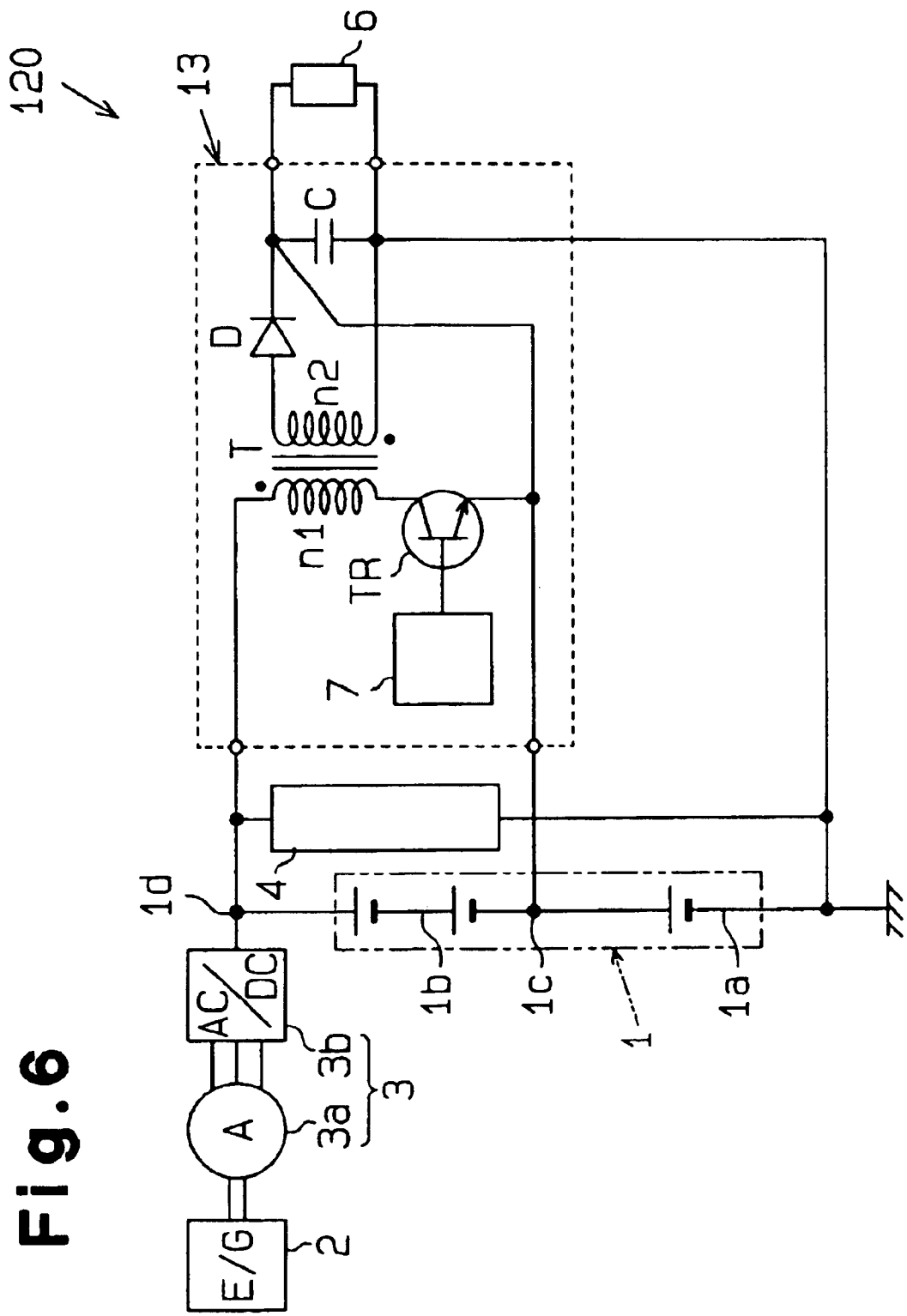
FIG. 6 is a schematic block diagram of a power converting apparatus according to a third embodiment of the present invention.
Figure 7:
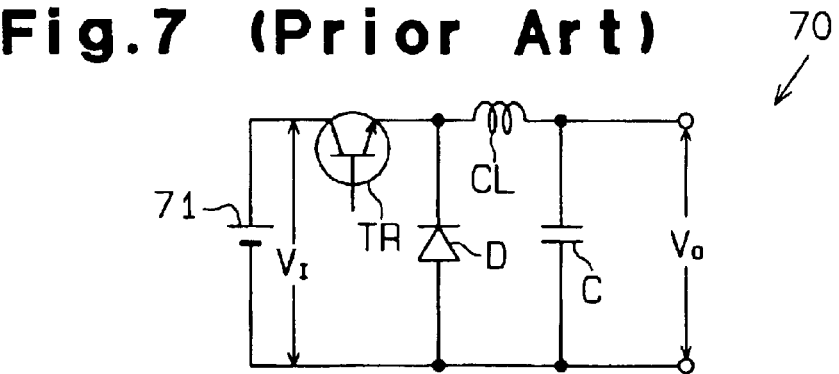
FIG. 7 is a first prior art circuit diagram of a voltage-drop type DC-DC converter.
Figure 8:
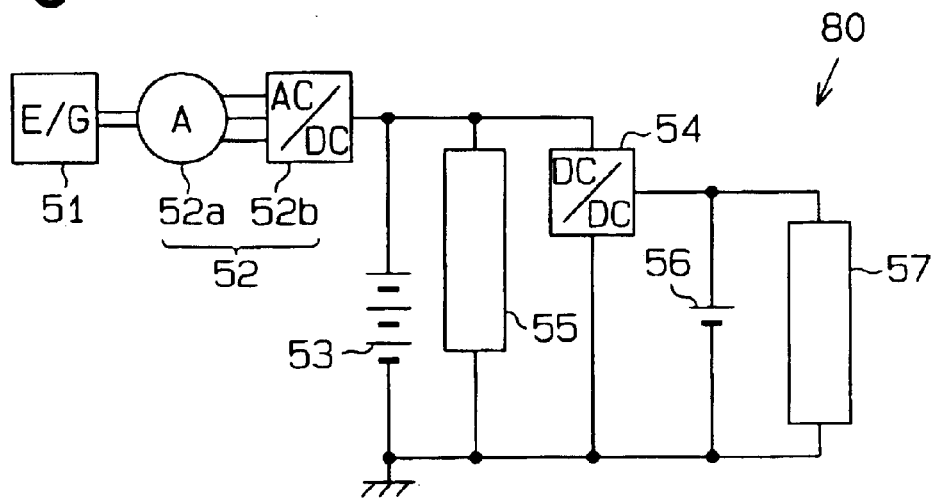
FIG. 8 is a schematic block diagram of a prior art double power-supply system for a vehicle.
Figure 9:
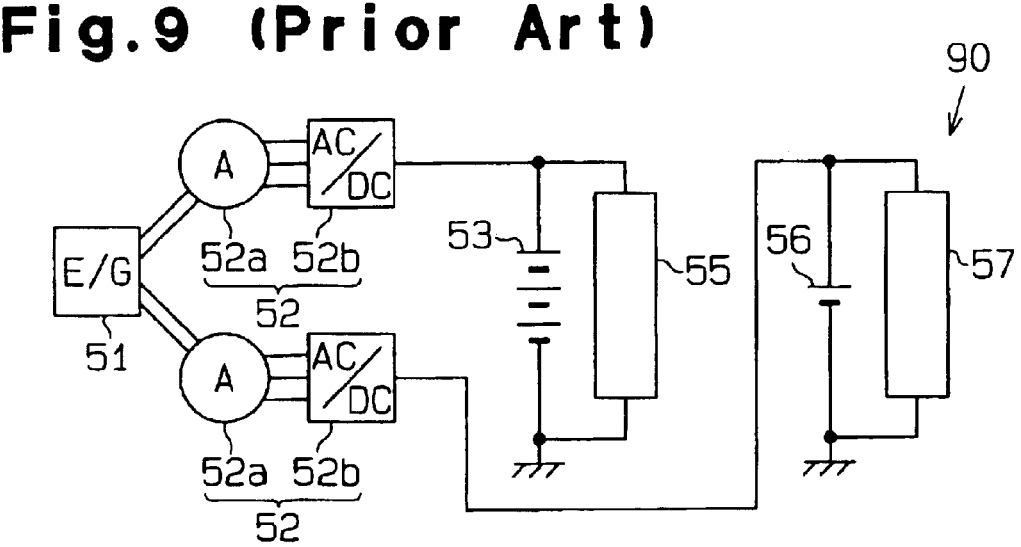
FIG. 9 is a schematic block diagram of another prior art double power-supply system for a vehicle.

As shown in FIG. 6, the fly-back converter 13 is connected to the second battery cell 1b, so that the output voltage (24V) of the second battery cell 1b is applied to the fly-back converter 13. The headlight 6 is connected to the output terminal of the fly-back converter 13 and the first battery cell 1a.

When a transistor TR is on, electric energy is stored in a transformer T. When the transistor TR is off, on the other hand, the electric energy stored in the transformer T is discharged. Given that the number of turns of the primary winding of the transformer T is denoted by n1 and the number of turns of the secondary winding is denoted by n2, the following equation is satisfied when the secondary current continuously flows.

$$V_O=(n2/n1)(T_{on}/T_{off})V_I$$

The control circuit 7 controls the ON/OFF action of the transistor TR in such a way that the output voltage $V_O$ of the fly-back converter 13 coincides with the operational voltage of 12V for the headlight 6.

The third embodiment has the following additional advantages.

The use of the insulated DC-DC converter 5 permits the power converting apparatus 120 to be used as a switching power supply that must provide electric insulation between the input side device and the output side device.

As the power converting apparatus 120 has the insulated fly-back converter 13, it has a simpler structure than one that has a forward converter.

The first to third embodiments may be modified as follows.

Instead of using the battery assembly 1 that has the first battery cell 1a and the second battery cell 1b, the first battery cell 1a and the second battery cell 1b may be arranged separately.

In the first to third embodiments, the control circuit 7 that performs analog control of the ratio of the ON time of the transistor TR1 to the OFF time thereof may be replaced with a control unit that has a CPU. In this case, the CPU computes the ratio of the ON time of the transistor TR1 to the OFF time thereof based on the detection signals of the first and second voltage sensors 8 and 9. Preferably, the ON/OFF switching of the transistor TR1 is controlled using PWM based on this computed ratio. Available as this CPU is a CPU that is used in an apparatus other than the power converting apparatus 100, 110 or 120.

The first embodiment may use current sensors which respectively detect the amount of the current flowing across the inductor L1 and the amount of the current coming back to the battery cell 1a from the headlight 6. In this case, the control circuit 7 controls the transistor TR1 in such a manner that the ratio of the value of the two currents detected by the current sensors becomes a predetermined value (e.g., 2:1). In the second and third embodiments, the currents may be detected instead of the voltages. In this case too, the control circuit 7 controls the transistor based on the detected current values.

In the second embodiment, a parallel circuit of a bipolar transistor and a diode may be provided in place of the transistors (MOSFETs) TR1 and TR2.

Instead of the MOSFET and the bipolar transistor, for example, other switching elements, such as an SIT (Static Induction Transistor) and a thyristor, may be used.

Instead of the running motor 4, another unit may be connected to the power converting apparatus 100, 110 or 120. The power converting apparatus 100, 110 or 120 may be adapted for use in a vehicle that is not equipped with the running motor 4 or may be adapted for use in a battery-powered vehicle which does not have an engine.

The power converting apparatus 100, 110 or 120 may be adapted for use in other apparatuses and equipment than a vehicle.

The fly-back converter 13 may be replaced with another type of DC-DC converter which has the transformer T.

A booster type insulated converter whose transformer T has a different turn ratio of the primary winding to the secondary winding from that of the transformer T of the fly-back converter 13 may be used.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method of supplying power using a main DC power supply for generating a predetermined voltage to supply a first output voltage substantially equal to the predetermined voltage and a second output voltage lower than the predetermined voltage, comprising the steps of:
   connecting a first DC power supply for generating the same voltage as the second output voltage in series to a second DC power supply for generating a differential voltage between the first output voltage and the voltage from the first DC power supply, thereby forming the main DC power supply,
   connecting a DC-DC converter to the second DC power supply; and
   stepping down the voltage output from the second DC power supply to produce the second output voltage by using the DC-DC converter.

2. A power converting apparatus for generating a first output voltage and a second output voltage lower than the first output voltage, comprising:
   a first DC power supply for generating the same voltage as the second output voltage;
   a second DC power supply, connected in series to the first DC power supply, for generating a voltage corresponding to a difference between the first output voltage and the voltage from the first DC power supply; and
   a DC-DC converter, connected to the second DC power supply, for converting the voltage from the second DC power supply to the second output voltage.

3. The power converting apparatus according to claim 2, wherein the DC-DC converter includes a polarity-inverting type DC-DC converter, the second DC power supply is connected to an input of the polarity-inverting type DC-DC converter, and the first DC power supply is connected to an output of the DC-DC converter.

4. The power converting apparatus according to claim 2, wherein the DC-DC converter includes an insulated DC-DC converter, the second DC power supply is connected to an input of the insulated DC-DC converter, and the first DC power supply is connected to an output of the DC-DC converter.

5. A power converting method of supplying a first output voltage substantially equal to a voltage of a main battery and a second output voltage lower than the voltage of the main battery, comprising the steps of:
   forming the main battery by connecting a first battery for generating the same voltage as the second output voltage in series to a second battery for generating a voltage corresponding to a difference between the first output voltage and the voltage of the first battery;
   producing the first output voltage by adding the voltages of the first and second batteries;
   connecting a charge power supply for generating a voltage lower than the voltage of the main battery to a step-up DC-DC converter;
   stepping up the voltage of the charge power supply using the step-up DC-DC converter to produce a differential voltage between the voltage of the main battery and the voltage of the charge power supply; and
   charging the main battery with a sum of the differential voltage and the voltage of the charge power supply.

6. A power converting apparatus for generating a first DC voltage and a second DC voltage lower than the first DC voltage, comprising:
   a first battery for generating the same voltage as the second DC voltage;
   a second battery, connected in series to the first battery, for generating a differential voltage between the first DC voltage and the voltage of the first battery; and
   a polarity-inverting type DC-DC converter having an input connected to the second battery and an output connected to the first battery, the DC-DC converter including a first switching element and a first diode connected in parallel to each other, a second switching element connected between the output of the DC-DC converter and the first battery, and a second diode connected in parallel to the second switching element.

7. The power converting apparatus according to claim 6, wherein the first switching element and the first diode are a first MOSFET and the second switching element and the second diode are a second MOSFET.

8. A power converting apparatus for a motor driven vehicle, comprising:
   a main battery assembly, connected between a high-potential power supply and a low-potential power supply, for generating a main output voltage for driving the vehicle motor, the main battery assembly including a first battery cell for generating a first voltage lower than the main output voltage, and a second battery cell, connected in series to the first battery cell, for generating a second voltage corresponding to a difference between the main output voltage and the first voltage; and
   a DC-DC converter, connected to the second battery cell, for converting the second voltage to a low voltage substantially equal to the first voltage.

9. The power converting apparatus according to claim 8, further comprising:
   a first voltage sensor for detecting the main output voltage, and
   a second voltage sensor for detecting the low voltage; and
   wherein the DC-DC converter includes:
   a switching element responsive to a control signal;
   an inductance connected in series to the switching element; and a control circuit, connected to the switching element and the first and second voltage sensors, for supplying the switching element with the control signal for controlling ON and OFF actions of the switching element based on detection signals from the first and second voltage sensors.

10. The power converting apparatus according to claim 9, wherein the switching element includes a MOSFET.

11. The power converting apparatus according to claim 9, wherein the control circuit includes:

a triangular wave oscillator for generating a triangular wave signal having a predetermined cycle; and a comparator for comparing a difference between detection signals from the first and second voltage sensors with the triangular wave signal and generating a pulse signal according to a comparison result, wherein the control circuit sends the pulse signal as the control signal to the switching element.

12. The power converting apparatus according to claim 11, wherein the control circuit controls a ratio of an ON time of the switching element to an OFF time thereof by changing a pulse width of the pulse signal, thereby adjusting a level of the low voltage.

13. The power converting apparatus according to claim 11, wherein the comparator generates a high-level pulse signal when the difference between the detection signals from the first and second voltage sensors is greater than the triangular wave signal and generates a low-level pulse signal when the difference between the detection signals from the first and second voltage sensors is smaller than the triangular wave signal.

* * * * *